Sept. 6, 1938.  A. C. LILLIE  2,128,951
SIDE WINDSHIELD
Filed July 14, 1936

Inventor
Arthur C. Lillie
By Hazard and Miller
Attorneys

Patented Sept. 6, 1938

2,128,951

UNITED STATES PATENT OFFICE 2,128,951

SIDE WINDSHIELD

Arthur C. Lillie, Los Angeles, Calif.

Application July 14, 1936, Serial No. 90,506

2 Claims. (Cl. 296—84)

My invention relates to a side windshield, sometimes designated as windwings, applied to the windows of a motor car usually to the windows in the front door of an enclosed car.

An object and feature of my invention in this type of windshield or windwing, is providing a construction which normally holds the glass windshield at an angle to the side of the vehicle with the front portion close to the frame of the window and the trailing edge projecting outwardly in order to deflect the wind. A further feature is adapting my invention to a type of window used on motor cars in which the front edge of the window has a decided rearward slope from the lower to the upper portion of the window and hence with the old style of windwing would allow the wind to pass behind the glass of the side windshield and blow into the car. Therefore a further feature of my invention is the employment of a supporting frame at both the top and bottom and also the leading edge of the glass which operates not only to deflect the wind outwardly, but prevents rain, sleet or snow from penetrating through the open window into the vehicle while the vehicle is travelling.

A further detail feature of my invention is forming this frame quite wide at the rear portions at both the top and bottom and having it tapered towards the front or leading edge of the windshield. This wide portion of the frame at the top also catches the drip of water from the roof which may be running forwardly and off the side of the car and directs this downwardly towards the front or when the rain is very heavy, allows it to be blown off the top while the vehicle is travelling and being deflected by the flow of air out of the open window of the car. Thus, with my invention, the window may be left open and the windwing deflect the wind and rain or the like outwardly. A further detail feature of my invention is attaching the frame which holds the glass to the molding of a door or the like, which door is provided with a window so that there is no interference between the frame and the glass or side windshield with the operation of the glass window. Also the frame is provided with a rubber gasket which when the frame and the windshield is in its normal position, that is, with the leading edge closely contiguous to the front portion of the window, a seal is formed between the frame of the side windshield and the molding of the frame of the door. The device is pivoted on vertical pivots so that the frame with the glass of the side windshield may be adjusted to have the leading edge located at variable distances from the window frame and thus deflect air while the vehicle is travelling into the vehicle through the open window.

My invention is illustrated in connection with the accompanying drawing, in which.

Figure 1:
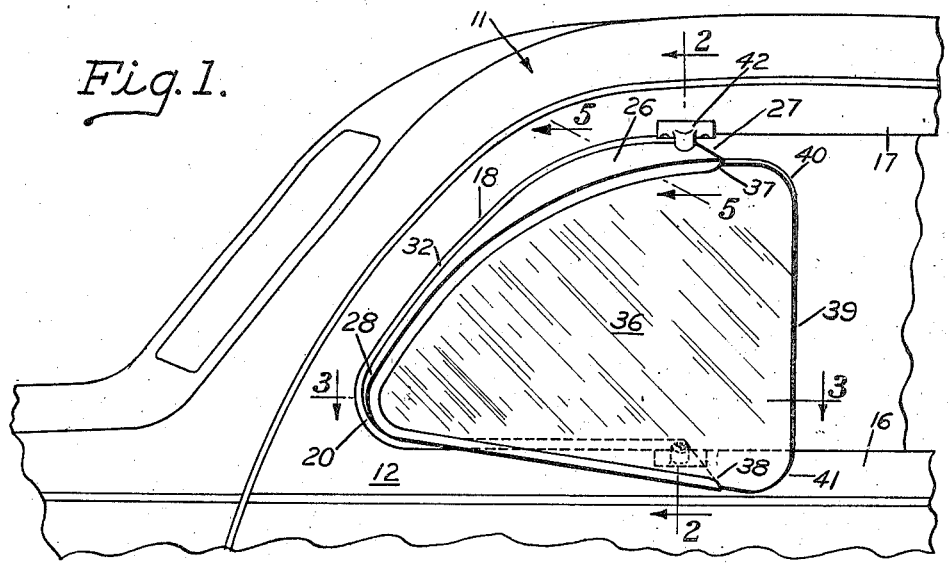
Fig. 1 is a partial perspective view of the front of a vehicle showing my invention applied thereto and located in the normal driving position to deflect the flow of air and rain outwardly.

In my invention the upper part of the body of a closed vehicle is indicated by the numeral 11 in which a portion of the door is designated by the numeral 12. This has a conventional sash construction 13 with felt or rubber pads 14 in which the window glass 15 slides and is guided, the glass when housed being moved downwardly and when it is in its upper position forms a window closure. In this construction the lower part of the window frame 16 may be considered as the sill. The upper part 17 is the top of the window frame and the forward sloping part 18 as the stile of the frame. In my invention the outer part of the door frame has a curved molding indicated at 19, this molding extending along the sill having a curved corner 20 at the forward junction of the sill and the stile. The same type of molding follows the inclined stile and merges with the top of the frame.

In my invention I employ a windshield frame 25 which has an upper wide section 26. This has a rear edge 27 normally transverse to the window frame and tapers towards the forward lower end of the frame, indicated at 28. There is then a bottom portion 29 which diverges from the front and terminates at the rear edge 30. This frame along its inner edge has a grooved molding 31 in which is fitted a rubber or a similar gasket 32. This molding and gasket thus follows the contour of the frame from the top rear edge 27 to the front or leading portion 28 and to the lower rear edge 30. The outer part of the frame also is provided with a metal channel 33 which follows the contour of the outer edge 34 of the plate forming the frame. This is provided with a rubber packing 35 and holds the glass 36 in place. Such glass may be inserted from the rear ends 37 at the top and 38 at the bottom of the channel. The glass preferably has a vertical rear edge 39 connecting with its upper and lower portions by convex curves 40 and 41, thus providing a rear portion of the glass extending slightly rearwardly from the frame supporting the glass.

The frame is mounted on the door by providing an upper bracket plate 42 riveted or otherwise secured to the upper portion of the door frame. This has a socket 43 through which extends a pivot screw 44. Likewise at the bottom or sill portion of the frame, there is another bracket plate 45 riveted or secured by screws to the molding part of the door. This also has a socket 46 through which is threaded the pivot screw 47. Rubber washers 48 are preferably used between the socket structure and the metal frame of the windshield. It will be noted that these pivots are in vertical alignment and located adjacent the rear or wide portion of the metal frame of the windshield. They are so positioned relative to the frame that when the windshield is in its normal driving position, that the rubber gasket 32 contacts the molding on the outside of the door frame, thus excluding wind and water from blowing in the open window. With this construction and location of the pivots, the windshield may be turned slightly on these pivots, moving the front end portion 28 outwardly and thus causing the rear edge 39 of the glass to approach more closely to the side of the vehicle. This causes a spacing of the front portion of the gasket 32 from the door frame allowing air to blow behind the frame and behind the glass 36 and thus be deflected into the open window of the vehicle. It will be noted by having the wide top portion 26 of the frame, that when this is in the normal driving position with the gasket 32 contacting the door frame, that any rain or water dripping from the top or front portion of the car, will either run down this inclined top portion of the frame or blow rearwardly off the top and thus prevent such water from blowing in the open window of the car.

Figure 2:
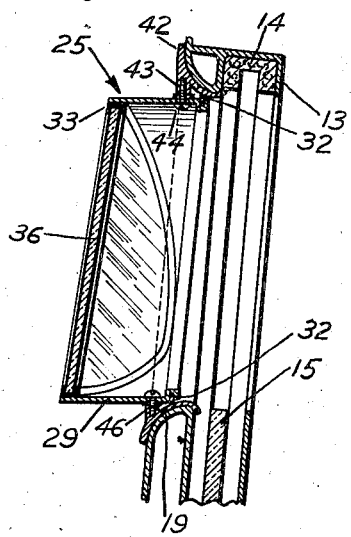
Fig. 2 is a vertical section on the line 2—2 of Fig. 1 is the direction of the arrows.
Figure 3:
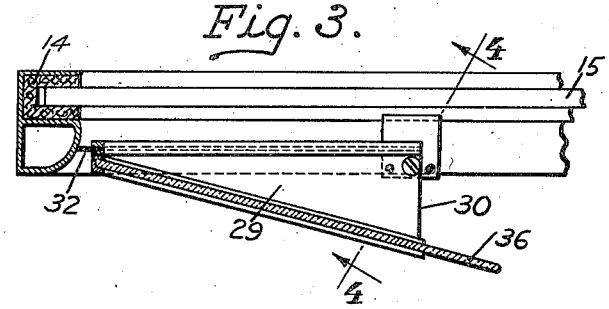
Fig. 3 is a horizontal section on the line 3—3 of Fig. 1 in the direction of the arrows.
Figure 4:
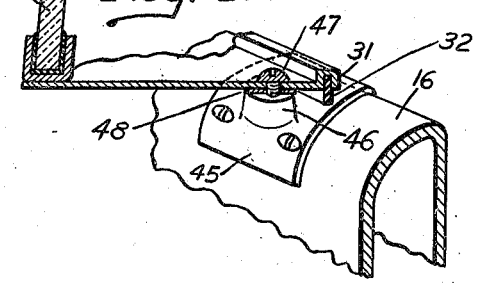
Fig. 4 is a partial transverse section on the line 4—4 of Fig. 3 in the direction of the arrows, illustrating the relative arrangement of the lower pivot on the molding of the door frame.
Figure 5:
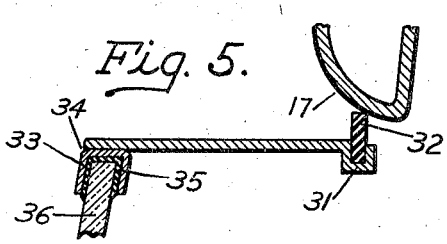
Fig. 5 is a partial transverse section on the line 5—5 of Fig. 1 in the direction of the arrows showing the gasket seal of the windshield frame and the molding of the door frame.

It is to be noted by my invention that the windshield frame when positioned as shown in Figs. 1, 2 and 3 of the drawing forms an effective rain screen, for instance, the wide upper section 26 converges downwardly and also has a convex curve considered in the longitudinal direction and thereby conforms to the forward sloping stile 18 of the window of the vehicle. This upper part 26 converges at 28 forming a corner junction with the tapered horizontal bottom portion 29. Therefore although the window glass diverges outwardly from the forward stile of the window, the frame prevents rain from beating downwardly inside of the glass 36 and also the bottom 29 prevents an upward splash of mud or water thrown by other vehicles. Therefore by employing a side windshield made in accordance with my invention the driver may have the window wide open or when the window adjacent the driver's seat is formed in a front and rear part he may at least have the front part completely open and thus have the desired ventilation. Furthermore, the rubber gaskets 32 which encircle the frame 25 adjacent the window frame form an effective seal against rain and splashing water or mud.

Various changes may be made in the details of the construction without departing from the spirit or scope of the invention as defined by the appended claims.

1. A side windshield comprising a windshield frame having a substantially horizontal bottom portion and an upper portion the same width at each rear end, the rear end of the upper portion being substantially horizontal, the bottom portion converging towards the forward corner and the upper portion tapering towards the same corner and also having a convex curve considered in a longitudinal direction to conform to a sloping stile at the front of a side window of an automobile, the converging bottom and top portions being joined at the front corner, a lower and an upper pivot connecting respectively the bottom and the top portions adjacent their rear inner edges with means for mounting said pivots on the window sill and the top of the window frame, a windshield glass secured to the windshield frame and conforming to the shape of such frame, the glass being located adjacent the outer edge of the frame and thereby having the rear portion of the glass spaced from the pivots whereby when the inner edge of the frame is substantially parallel to the window the windshield diverges outwardly from the front stile of the window, the upper tapering and convex portion of the frame being adapted to form a rain guard between the windshield glass and the window frame.

2. A side windshield as claimed in claim 1, the inner edge of the windshield frame including the bottom portion, the top downwardly curved portion and the front corner having a flexible gasket secured thereto, said gasket being adapted to engage the outside of the sill of the window, the top portion of the window frame and the front stile of the window.

ARTHUR C. LILLIE.